(12) United States Patent
Moellmann et al.

(10) Patent No.: US 12,339,235 B2
(45) Date of Patent: Jun. 24, 2025

(54) SIMULTANEOUS BACK AND/OR FRONT AND/OR BULK DEFECT DETECTION

(71) Applicant: Onto Innovation Inc., Wilmington, MA (US)

(72) Inventors: Felix Moellmann, Zurich (CH); Mark Varner, Snoqualmie, WA (US); Andrew Phillip Frazier, Snoqualmie, WA (US)

(73) Assignee: Onto Innovation Inc., Wilmington, MA (US)

( * ) Notice: Subject to any disclaimer, the term of this patent is extended or adjusted under 35 U.S.C. 154(b) by 119 days.

(21) Appl. No.: 17/980,468

(22) Filed: Nov. 3, 2022

(65) Prior Publication Data
US 2023/0152241 A1    May 18, 2023

Related U.S. Application Data

(60) Provisional application No. 63/280,949, filed on Nov. 18, 2021.

(51) Int. Cl.
| | |
|---|---|
| *G01N 21/88* | (2006.01) |
| *G01N 21/95* | (2006.01) |
| *G06T 7/00* | (2017.01) |

(52) U.S. Cl.
CPC ..... *G01N 21/8851* (2013.01); *G01N 21/9501* (2013.01); *G06T 7/001* (2013.01);
(Continued)

(58) Field of Classification Search
CPC .......... G01N 21/8851; G01N 21/9501; G01N 21/3563; G01N 2021/3155;
(Continued)

(56) References Cited

U.S. PATENT DOCUMENTS 4,764,014 A * 8/1988 Makosch .............. G03F 9/7049
356/495
6,376,329 B1 * 4/2002 Sogard .................. G03F 9/7084
438/462
(Continued)

FOREIGN PATENT DOCUMENTS

| CN | 107976422 A | 5/2018 |
|---|---|---|
| JP | 2001-516874 A | 10/2001 |

(Continued)

OTHER PUBLICATIONS

English translation of JP2008-032433, published Feb. 14, 2008. (Year: 2008).*

*Primary Examiner* — Christina A Riddle
(74) *Attorney, Agent, or Firm* — Paradice & Li LLP

(57) ABSTRACT

An inspection system for inspecting multiple surfaces of a substrate includes at least one illuminator that produces light at a first wavelength that is incident on the substrate at a first angle (e.g., normal) and light at a second wavelength directed that is obliquely incident on the substrate. An adjustment system adjusts the oblique angle. The substrate may be opaque to one of the wavelengths and at least partially transparent to the other wavelength. Detection optics collect backscattered light from the substrate and at least one detector generates a first image representative of the first surface of the substrate and a second image representative of a second surface or near the second surface of the substrate. The images may be compared to generate a third image representative of defects on or near the second surface of the substrate corrected for residual signals of defects on the first surface.

21 Claims, 5 Drawing Sheets

(52) U.S. Cl.
CPC ............ *G06T 2207/10152* (2013.01); *G06T 2207/30148* (2013.01)

(58) Field of Classification Search
CPC ... G01N 2021/8825; G01N 2021/8841; G01N 2021/8845; G01N 21/8806; G01N 2021/8809; G01N 2021/8858; G01N 2021/8887; G01N 2201/0637; G01N 21/956; G01N 2021/8835; G01N 21/95607; G01N 21/9503; G01N 21/9505; G01N 21/47; G01N 2021/4735; G01N 2021/8822; G01N 2021/8848; G01N 2021/9511; G01N 21/45; G01N 21/95; G01N 21/95684; G01N 2201/06113; G01N 2201/064; G01N 21/21; G01N 2201/1047; G01N 2021/8854–8896; G01N 2021/8967; G01N 2021/8925; G01N 21/892; G06T 7/001; G06T 2207/10152; G06T 2207/30148; G06T 7/0004; H01L 22/12; H01L 22/10; G03F 7/70; G03F 7/70483–705; G03F 7/70508; G03F 7/70516; G03F 7/70605–706851
USPC ........... 356/237.1–237.6; 355/18, 30, 52–55, 355/67–77
See application file for complete search history.

(56) References Cited

U.S. PATENT DOCUMENTS

| | | | |
|---|---|---|---|
| 6,809,809 B2 | 10/2004 | Kinney et al. | |
| 7,907,269 B2 | 3/2011 | Meeks | |
| 8,072,591 B2 | 12/2011 | Markwort et al. | |
| 8,502,979 B2 | 8/2013 | Levy et al. | |
| 8,823,935 B1* | 9/2014 | Meeks | G01N 21/8806 356/600 |
| 9,354,177 B2 | 5/2016 | Sappey | |
| 9,645,094 B2 | 5/2017 | Honda et al. | |
| 2001/0000679 A1* | 5/2001 | Vaez-Iravani | G01N 21/474 356/237.4 |
| 2004/0012775 A1 | 1/2004 | Kinney et al. | |
| 2004/0207836 A1 | 10/2004 | Chhibber et al. | |
| 2010/0007872 A1* | 1/2010 | Isozaki | G01N 21/47 356/51 |
| 2015/0253256 A1 | 9/2015 | Zhou | |

FOREIGN PATENT DOCUMENTS

| | | |
|---|---|---|
| JP | 2008-032433 A | 2/2008 |
| JP | 2009145141 A | 7/2009 |
| KR | 1996-0013736 B | 10/1996 |

* cited by examiner

SIMULTANEOUS BACK AND/OR FRONT AND/OR BULK DEFECT DETECTION

CROSS REFERENCE TO RELATED APPLICATIONS

This application claims priority under 35 USC 119 to U.S. Provisional Application No. 63/280,949, entitled "SIMULTANEOUS BACK AND/OR FRONT AND/OR BULK DEFECT DETECTION," filed Nov. 18, 2021, which is incorporated herein by reference in its entirety.

TECHNICAL FIELD

The present disclosure generally relates to inspection systems, in particular high throughput substrate inspection systems with simultaneous back, front, and/or bulk defect detection with submicron sensitivity.

BACKGROUND

Semiconductor and other similar industries, often use optical metrology equipment to provide non-contact evaluation of substrates during processing. Optical metrology is often used to determine one or more characteristics of a sample or features on the sample. Another type of evaluation of samples is defect inspection. Defects, such as particles or other irregularities on a sample, may interfere with the performance of resulting devices. Conventionally, optical tools used to detect defects use bright-field and dark-field inspection. Bright-field and dark-field detection tools detect defects based on the scattering of light caused by defects. Improvements of optical tools used for defect inspection are desired.

SUMMARY

An inspection system for inspecting multiple surfaces of a substrate includes at least one illuminator that produces light at a first wavelength directed at a substrate at a first angle light at a second wavelength directed at the substrate at an oblique angle. An adjustment system may be present to adjust the oblique angle. The substrate may be opaque to one of the wavelengths and at least partially transparent to the other wavelength. Detection optics collect backscattered light from a first surface and a second surface of the substrate in response to the light. At least one detector receives the backscattered light and generates a first image representative of the first surface of the substrate and a second image representative of a second surface or near the second surface of the substrate. The images may be compared to generate a third image representative of defects on or near the second surface of the substrate corrected for residual signals of defects on the first surface.

In one implementation, an inspection system for substrate inspection includes at least one illuminator that generates light at a first wavelength directed at a substrate at a first angle and generates light at a second wavelength directed at the substrate at a second angle that is an oblique angle with respect to a first surface of the substrate. An adjustment system in the inspection system adjusts the second angle to focus the light at the second wavelength at a specified location. The inspection system includes detection optics that collect backscattered light from the substrate in response to the light from the at least one illuminator. The inspection system further includes at least one detector that receives the backscattered light in a first spectrum and generates a first image representative of the first surface of the substrate, and receives the backscattered light in a second spectrum to generate a second image representative of a second surface or near the second surface of the substrate.

In one implementation, a method for inspecting a substrate includes generating light at a first wavelength directed at a substrate at a first angle and generating light at a second wavelength directed at the substrate at a second angle that is an oblique angle with respect to a first surface of the substrate. The second angle may be adjusted to focus the light at the second wavelength at a specified location. Backscattered light is collected from the substrate in response to the light at the first wavelength and the second wavelength. The method includes generating a first image representative of the first surface of the substrate based on the backscattered light in a first spectrum and generating a second image representative of a second surface or near the second surface of the substrate based on the backscattered light in a second spectrum.

In one implementation, an inspection system includes a means for generating light at a first wavelength directed at a substrate at a first angle and a means for generating light at a second wavelength directed at the substrate at a second angle that is an oblique angle with respect to a first surface of the substrate. The inspection system includes a means for adjusting the second angle to focus the light at the second wavelength at a specified location. A means for collecting collects backscattered light from the substrate in response to the light at the first wavelength and the second wavelength. The inspection system further includes a means for generating a first image representative of the first surface of the substrate based on the backscattered light in a first spectrum and a means for generating a second image representative of a second surface or near the second surface of the substrate based on the backscattered light in a second spectrum.

DETAILED DESCRIPTION

Figure 1A:
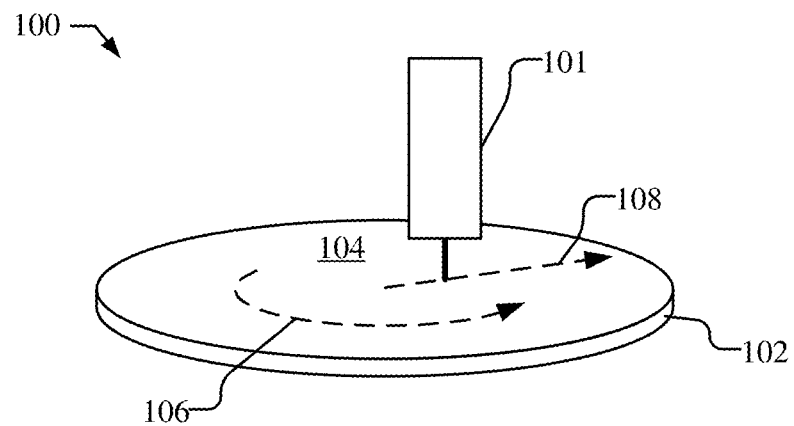
FIGS. 1A and 1B illustrate example of an inspection system in a front surface inspection configuration and a back surface inspection configuration, respectively.

Optical systems may be employed for various inspection applications. For example, semiconductor and other similar industries, often use optical metrology equipment to provide non-contact evaluation of substrates during processing. Samples, such as semiconductor wafers, may be inspected during processing to detect defects on the sample, e.g., by illuminating the sample and detecting backscattered light from the sample. One important performance criteria for inspection systems is throughput, as the samples are typically inspected during processing. Inspection systems, however, are typically limited with respect to throughput. For example, inspection systems typically inspect either a front side or back side of a sample at one time. Thus, inspection of more than one surface increases the inspection time, thereby reducing throughput and minimizing contact with the substrate, thereby improving cleanliness of the substrates.

As discussed herein, improvements to an inspection system and design are provided by enabling simultaneously inspection of two or more of the backside of the sample, frontside of the sample, and bulk characteristics of the sample (e.g., semiconductor wafer) while maintaining high throughput. The inspection system, for example, may include two channels: a first channel may use light with a first wavelength that is directed at a substrate at a first angle to detect defects on the first surface of a substrate, and a second channel may use light with a second wavelength that is directed at the substrate at a second angle that is an oblique angle to detect defects on or near a second surface of the substrate. An adjustment system may be present to adjust the second angle to focus the light with the second wavelength at a specified location. The first wavelength may be in the visible spectrum to detect defects on the first surface, such as the proximal/near surface of the object (e.g., backside of a wafer), and the second wavelength may be in the infrared or near-infrared spectrum to detect defects on or near the distal/opposing surface of the object (frontside of a wafer) and/or bulk characteristics. The light with the first wavelength may be directed at or near a normal angle with respect to the substrate.

Techniques described herein add a secondary, different wavelength set of illumination and detector which may be used for dual purpose defect inspection. By setting the primary wavelength (e.g., in the visible spectrum) so that the substrate of interest is opaque, while setting the secondary wavelength (e.g., in the infrared or near infrared spectrum) so that the substrate of interest is at least partially transparent, the primary wavelength may be used for defect inspection on the near surface while the secondary wavelength may be used for defect inspection on the opposing surface or for measuring bulk characteristics. In addition, comparison of both the primary and secondary channel can determine whether detected defects are located on the near surface (in which case both channels will receive the signal) or in the bulk or opposing surface (in which case only the secondary channel will receive the signal).

FIG. 1A illustrates example portions of an inspection system 100 in a conventional front surface inspection configuration. The inspection system 100 includes an inspection head 101, e.g., including an illumination device and detector. The inspection head 101 illuminates the front surface 104 of a wafer 102 and detects backscattered light from defects on the front surface 104. Because the inspection head 101 illuminates and detects backscattered light from the near surface of the wafer, the inspection head 101 may use wavelengths (e.g., in the visible spectrum) that do not penetrate the wafer 102, i.e., the wafer 102 is opaque to the wavelengths used by the inspection head 101. The inspection system 100 may include a rotating wafer chuck (not shown) for holding the wafer 102 and rotating the wafer 102 during inspection (as illustrated by curved arrow 106). For example, the chuck may be provided as a backside vacuum chuck. The inspection head 101 may additionally scan across the wafer 102, e.g., from the center radially outward (as illustrated by arrow 108). The inspection head 101, for example, may be on an arm or a track.

Figure 1B:
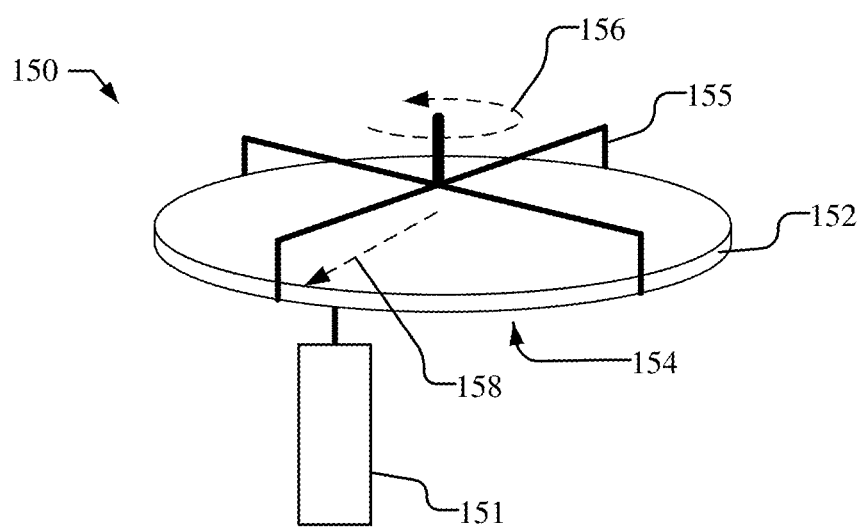

FIG. 1B illustrates example portions of an inspection system 150 in a back surface inspection configuration. The inspection system 150 includes an inspection head 151 (similar to inspection head 101 shown in FIG. 1A), e.g., including an illumination device and detector. The inspection head 151 illuminates the back surface 154 of a wafer 152 and detects backscattered light from defects on the back surface 154. Similar to inspection head 101, because the inspection head 151 illuminates and detects backscattered light from the near surface of the wafer, the inspection head 151 may use wavelengths (e.g., in the visible spectrum) that do not penetrate the wafer 152, i.e., the wafer 152 is opaque to the wavelengths used by the inspection head 151. The inspection system 150 may include a rotating wafer chuck 155 for holding the wafer 152 and rotating it during inspection (as illustrated by curved arrow 156). For example, the chuck 155 may be provided as an edge clamp, which may provide clearance behind the wafer 152. The inspection head 151 may scan across the wafer 152, e.g., from the center radially outward (as illustrated by arrow 158).

As discussed above, with the use of conventional inspection systems, such as illustrated in FIGS. 1A and 1B, only one surface of the substrate is inspected at a time. Consequently, if both the top surface and bottom surface are to be inspected, one surface of the substrate is inspected by one inspection system before transferring the substrate to a second inspection system where the other surface may be inspected. Consequently, the inspection time is increased, which reduces throughput and increases wafer contacts which increases the risk of contamination.

Figure 2:
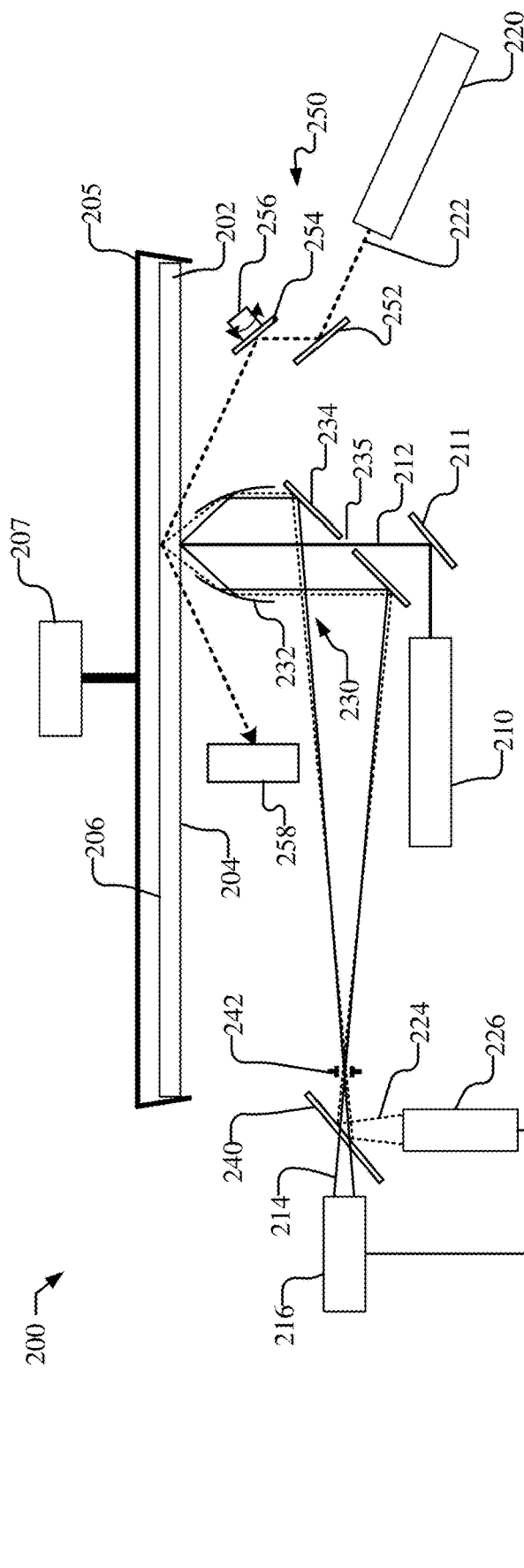
FIG. 2 illustrates portions of an inspection system that includes two channels for simultaneous inspection of multiple surfaces of a substrate using two different wavelengths of light.

FIG. 2 illustrates example portions of a cross-section of an inspection system 200 that includes two channels for simultaneous inspection of multiple surfaces of a substrate 202 using two different wavelengths of light. The inspection system 200 is illustrated in a back surface inspection configuration with an edge clamp chuck 205, but in some implementations, the inspection system 200 may be provided in a front surface inspection configuration, e.g., with a backside vacuum chuck.

The inspection system 200 includes at least one illuminator that generates light different wavelengths that are incident on the substrate 202 at different angles of incidence. For example, as illustrated, the inspection system 200 includes a first channel with a first light source 210 that generates light 212, which has a first wavelength, that is incident on the bottom surface 204 of the substrate 202 at a normal or near normal angle of incidence, and a second channel with a second light source 220 that generates light 222, which has a second wavelength, that is incident on the bottom surface 204 of the substrate 202 at an oblique angle of incidence. If desired, a single light source may be used that generates light with different wavelengths, where light with a first wavelength may be directed along the first channel and light with the second wavelength may be directed along the second channel, e.g., using a chromatic beam splitter.

The first light source 210 in the first channel, for example, may be a laser or other appropriate high brightness light source. The first light source 210 operates at the first wavelength, which may be in the visible spectrum. The first wavelength may be chosen based on the surface properties of the material of the substrate 202 being inspected. For example, the first light source 210 may produce light between, e.g., 400-700 nm for silicon wafers. The first light source 210 and optical elements, such as turning mirror 211 and turning mirror 234 of detection optics 230 and focusing optics (not shown), may be configured so that the light 212 produced by the first light source 210 is at normal angle of incidence or near normal angle of incidence to the substrate 202 being inspected. In some implementations, the first light source 210 and optical elements may be mounted so that light 212 is slightly off normal (e.g., 0-10° offset to normal). The first wavelength generated by the first light source 210 is selected so that the substrate 202 is opaque to light 212 and, thus, the first light source 210 is used to detect defects on the proximal surface 204 of the substrate 202, which in the example shown in FIG. 2 is the back surface of the substrate 202.

The second light source 220 in the second channel, for example, may be a laser or other appropriate high brightness light source. The second light source 220 operates at the second wavelength, which may be in the infrared or near-infrared spectrum. The second wavelength may be chosen based on the transmittance properties of the material of the substrate 202 being inspected. For example, the second light source 220 may produce light between, e.g., 700-1400 nm for inspecting silicon wafers. The second light source 220 and any optical elements, such as focusing optics (not shown) may be mounted so that the light 222 produced by the second light source 220 is incident at an oblique angle of incidence to the substrate 202. The second wavelength generated by the second light source 220 is selected so that the substrate 202 is at least partially transparent to the light 222 and, thus, the second light source 220 is used to detect defects on or near the distal/opposing surface 206 of the substrate 202, which in the example shown in FIG. 2 is the front surface of the substrate 202, or to detect defects in bulk between the proximal surface 204 and the distal/opposing surface 206. The second wavelength, e.g., in the infrared or near infrared spectrum, penetrates the substrate 202 and, thus, can be used to detect defects in the volume of material and/or on or near the distal/opposing surface 206. Accordingly, the first light source 210 and the second light source 220 may operate at the same time and at the same location of the substrate 202 to detect defects on the front surface, back surface, and the bulk of the substrate 202.

It should be understood that while the first light source 210 is described herein as producing normal or near normal light, in some implementations, the light source 210 may produce light 212 that is incident on the substrate 202 at an oblique angle. Moreover, in some implementations, the second light source 220 may be mounted to produce light 222 that is normal or near normal, which may assist in detecting bulk defects. Further, in some implementations, the first light source 210 and the second light source 220 may be mounted on different sides of the substrate 202. For example, the first light source 210 may be mounted on the back side of the substrate 202, as illustrated, to perform surface inspection of the back surface in the visible spectrum, while the second light source 220 may be mounted on the top side of the substrate 202 to perform surface and bulk inspection in the infrared spectrum.

The inspection system 200 further includes detection optics 230 that collect backscattered light from the substrate 202. Both the first channel and second channel may use the same detection optics 230, which may have limited focus in X, Y, Z directions as discussed below in reference to FIG. 4. As illustrated, the detection optics 230 may include an elliptical mirror 232 and one or more turning mirrors 234. The elliptical mirror 232 may collect the backscattered light from both channels, e.g., backscattered light 214 produced by the proximal surface 204 of the substrate 202 in response to light 212 and backscattered light 224 produced by the distal/opposing surface 206 or bulk material of the substrate 202 (and may include some backscattered light from the proximal surface 204 of the substrate 202) in response to light 222. The turning mirror 234 may redirect the collected backscattered light to one or more detectors. As illustrated, the turning mirror 234 of the detection optics 230 includes an aperture 235 through which the light 212 may pass to be normally incident on the substrate 202. In some implementations, the elliptical mirror 232 of the detection optics 230 may include two slits, one slit provided for the light 222 to pass through to the substrate 202 and a second slit provided for light 222 reflected from the substrate 202 to pass through.

It should be understood that examples discussed herein sometimes refers to the use of darkfield imaging where collected backscattered light is representative of defects, but in some implementations, brightfield imaging may also or alternatively be used where collected reflected light of reduced intensity may be representative of defects.

The inspection system 200 further includes at least one detector that receives the backscattered light and generates images representative of the surfaces of the substrate 202. For example, as illustrated, the inspection system 200 includes a chromatic filter 240 that receives the backscattered light 214 and 224 from the turning mirror 234 after passing through aperture 242 and separates the backscattered light 214 and 224 based on wavelength. The backscattered light 214, which is produced in response to incident light 212, may be in a first spectrum that includes one or more visible wavelengths and the backscattered light 224, which is produced in response to incident light 222, may be in a second spectrum that includes one or more infrared or near infrared wavelengths. The chromatic filter 240, for example, may be a dichroic filter that directs the backscattered light 214 in response to the light 212 from the first light source 210 in the first channel to a first detector 216, and directs backscattered light 224 in response to the light 222 from the second light source 220 in the second channel to a second detector 226. Thus, one aperture 242 may be used for both detectors 216 and 226. In some implementations, the chromatic filter 240 may be located before the focal point for each detector 216, 226, and separate apertures may be used for each detector 216, 226, as opposed to the single aperture 242 shown in FIG. 2. Use of independent apertures, for example, may be useful as the backscattered light 214 and 224 originate in different z locations of the substrate and accordingly have different focal points. The use of a single aperture 242 for both detectors 216, 226, however, may be desirable if there is marginal impact as it simplifies the architecture, reduces space and improves robustness.

The chromatic filter 240 may separate the backscattered light into different spectrums. For example, chromatic filter 240 may allow visible light to pass through to the first detector 216 and reflect infrared light to the second detector 226. In some implementations, the chromatic filter 240 may reflect visible light and may allow infrared light to pass through. In other implementations, the chromatic filter 240 may be replaced with a diffraction element that may separate the wavelengths of the backscattered light, which are directed to and detected by different portions of a single two dimensional detector.

In some examples, apertures may be used to focus the backscattered light. For example, apertures may further limit the X, Y focus of the elliptical mirror. The smaller the aperture, the more limited the X, Y focus. Apertures may be placed before or after the chromatic filter 240 to increase the X, Y focus.

The first detector 216 may be configured to detect light, e.g., in the visible spectrum. For example, the first detector 216 may include avalanche photodiodes or photomultipliers. The second detector 226 may be configured to detect light in the infrared spectrum. For example, the second detector 226 may include avalanche photodiodes suited for infrared operations, such as an indium gallium arsenide (InGaAs) photodiode that is sensitive to infrared.

The first detector 216 (in combination with a processor) may generate images showing defects on the proximal (back) surface 204 of the substrate 202. The second detector 226 (in combination with the processor) may generate images showing defects on or near the distal (front) surface 206 of the substrate 202, or in bulk. For X, Y positions of the substrate 202 inspected by the inspection system 200, the inspection system 200 generates two separate signals, one for the backscattered light 214 produced in response to the first light 212 and the second for the backscattered light 224 produced in response to the second light 222.

In addition, in some implementations, the inspection system 200 may include an adjustment system 250 that adjusts the angle of the light 222 from the second light source 220 to focus the light 222 at a specified location of the substrate 202. As illustrated, the light 222 from the second light source 220 may be redirected at an oblique angle of incidence using the adjustment system 250. The adjustment system 250 may be used to improve inspection performance (e.g., sensitivity, repeatability,) and ease physical alignment constraints during build and calibration of the inspection system 200. The adjustment system 250, for example, may be used during calibration to properly align the area of incident of light 222, e.g., with the area of incidence of light 212. The adjustment system 250 may operate dynamically during substrate 202 inspection to equalize any substrate deformations or misalignment which otherwise may reduce signal repeatability. The adjustment system 250, for example, may include one or more moving mirrors. As illustrated, a first mirror 252 (e.g., a 45° mirror) may redirect the light 222 to a second mirror 254. The second mirror 254 may be coupled to an actuator 256 (e.g., piezoelectric), which may be controlled by a computing system, such as computing system 260, or another controller, such as a FPGA or logic embedded in an alignment sensor 258. The orientation of the second mirror 254 may be adjusted automatically during runtime to keep the second light source 220 focused on the specified spot in the substrate 202, e.g., at the distal surface 206, which may vary in the substrate 202 along the z axis. Some substrates 202, for example, may be deformed so that the second light source 220 may be adjusted during inspection to keep the focus at the specified z axis location of the substrate 202. The adjustment may be done based on the output of the alignment sensor 258 that detects the light 222 reflected from the substrate 202. This alignment sensor 258, for example, may be provided as a one dimensional sensor and may measure the position of the reflected light. In another implementation, a camera system may monitor the region of interest (from normal incidence or at oblique incidence) or to measure the position at which the light 222 is incident on the substrate. Based on the measured position of the reflected light, the second mirror 254 may be adjusted to focus the light 222 on the specified location of the substrate 202. Moreover, the elliptical mirror of the detection optics may include two slits, one slit provided for the light 222 to pass through to the substrate 202 and the second slit provided for the reflected light to exit the elliptical mirror 232 and to reach the alignment sensor 258.

Inspection system 200 further includes one or more computing systems 260 that is configured to perform inspection of the substrate 202 as described herein. The one or more computing systems 260 is coupled to the first detector 216 and the second detector 226 to receive the inspection data acquired by the detectors 216, 226 during inspection of the substrate 202. The one or more computing systems 260, for example, may be a workstation, a personal computer, central processing unit or other adequate computer system, or multiple systems. The one or more computing systems 260 may be configured to control the inspection process as well as to analyze the inspection data, e.g., in accordance with the methods described herein.

It should be understood that the one or more computing systems 260 may be a single computer system or multiple separate or linked computer systems, which may be interchangeably referred to herein as computing system 260, at least one computing system 260, one or more computing systems 260. The computing system 260 may be included in or is connected to or otherwise associated with inspection system 200. Different subsystems of the inspection system 200 may each include a computing system that is configured for carrying out steps associated with the associated subsystem. The computing system 260, for example, may control the positioning of the substrate 202, e.g., by controlling movement of a stage 207 coupled to the chuck 205, by controlling movement of the inspection head, e.g., the optical elements of the inspection system 200, or by controlling movement of both the stage 207 and the inspection head, e.g., via one or more actuators. The stage 207 and/or inspection head, for example, may be capable of horizontal motion in either Cartesian (i.e., X and Y) coordinates, or Polar (i.e., R and θ) coordinates or some combination of the two. In some implementations, for example, the stage 207 is moved rotationally (R), while the inspection head is moved laterally (θ). The stage 207 and/or the inspection head, e.g., optical components of the inspection system 200, may also be capable of vertical motion along the Z coordinate. Vertical motion of the inspection head along the Z coordinate may be particularly useful for adoption to different substrate types or thicknesses in a front side inspection with a backside vacuum chuck. The computing system 260 may further control the operation of the chuck 205 to hold or release the substrate 202.

The computing system 260 may be communicatively coupled to the first detector 216 and the second detector 226 in any manner known in the art. For example, the one or more computing systems 260 may be coupled to separate computing systems that are associated with the detectors 216, 226. The computing system 260 may be configured to receive and/or acquire inspection data or information from one or more subsystems of the inspection system 200, e.g., the detectors 216, 226. The transmission medium, thus, may serve as a data link between the computing system 260 and other subsystems of the inspection system 200.

The computing system 260, which includes at least one processor 262 with memory 264, as well as a user interface (UI) 268, which are communicatively coupled via a bus 261. The memory 264 or other non-transitory computer-usable storage medium, includes computer-readable program code 266 embodied thereof and may be used by the computing system 260 for causing the at least one computing system 260 to control the inspection system 200 and to perform the functions including the analysis described herein, including adjusting the angle of the second light 222 and generating and analyzing images of multiple surfaces of a substrate based on the inspection data provided by the detectors 216 and 226 to detect defects and to report detected defects, as discussed herein. The data structures and software code for automatically implementing one or more acts described in this detailed description can be implemented by one of ordinary skill in the art in light of the present disclosure and stored, e.g., on a computer-usable storage medium, e.g., memory 264, which may be any device or medium that can store code and/or data for use by a computer system, such as the computing system 260. The computer-usable storage medium may be, but is not limited to, include read-only memory, a random access memory, magnetic and optical storage devices such as disk drives, magnetic tape, etc. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described.

The results from the analysis of the data may be reported, e.g., stored in memory 264 associated with the substrate 202 and/or indicated to a user via UI 268, an alarm or other output device. Moreover, the results from the analysis may be reported and fed forward or back to the process equipment to adjust the appropriate fabrication steps to compensate for any detected variances in the fabrication process. The computing system 260, for example, may include a communication port 269 that may be any type of communication connection, such as to the internet or any other computer network. The communication port 269 may be used to receive instructions that are used to program the computing system 260 to perform any one or more of the functions described herein and/or to export signals, e.g., with inspection results and/or instructions, to another system, such as external process tools, in a feed forward or feedback process.

Figure 3A:
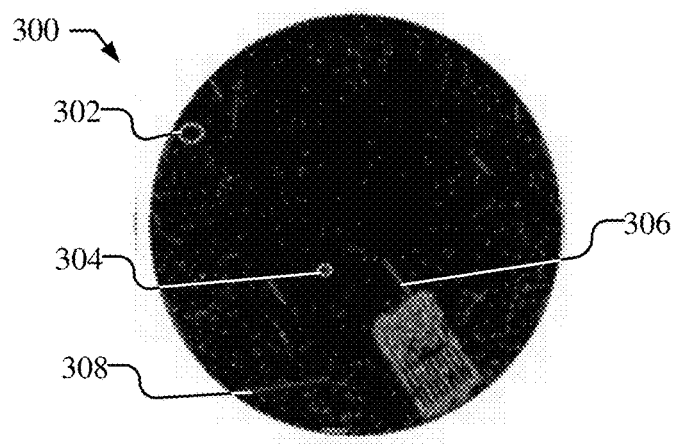
FIGS. 3A and 3B respectively illustrate an image (defect map) of a first surface of a substrate produced in response to light having a first wavelength and an image (defect map) of a second surface of a substrate produced in response to light having a second wavelength.
Figure 3B:
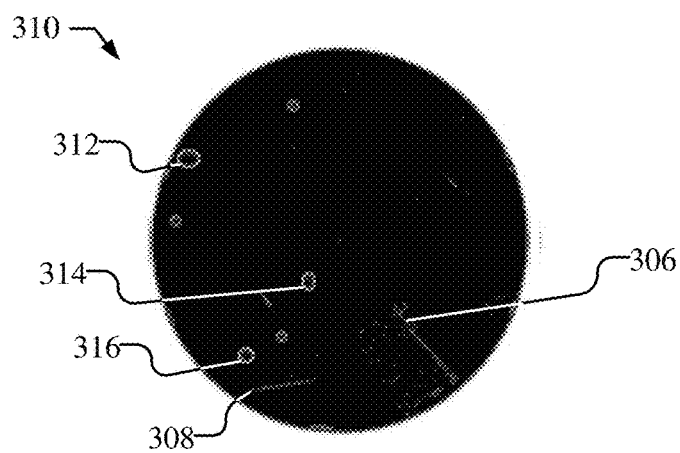

FIGS. 3A and 3B, by way of example respectively illustrate an image 300 (sometimes referred to as a defect map 300) generated based on the output of the first detector 216 and an image 310 (sometimes referred to as a defect map 310) generated based on the output of the second detector 226. The image 300 shown in FIG. 3A shows examples of defects 302, 304, 306, and 308 on the proximal surface detected using light 212 from the first light source 210. The image 310 shown in FIG. 3B shows defects 312, 314, and 316 on or near the distal surface using light 222 from the second light source 220, as well as some residual signal from the defects 306 and 308 of the proximal-side signal.

Hence, the two images 300 and 310 may be compared, e.g., by the computing system 260, and any residual proximal side signals in the image of the distal surface can be eliminated. For example, the two images 300 and 310 generated based on inspection data from the first detector 216 and the second detector 226 may be overlaid on top of each other. The position of the images 300 and 310 should be aligned because the same detection optics 230 are used. The defects found in the proximal surface (backside in the example illustrated in FIG. 2) may be subtracted from the distal surface (frontside in the example illustrated in FIG. 2).

Figure 3C:
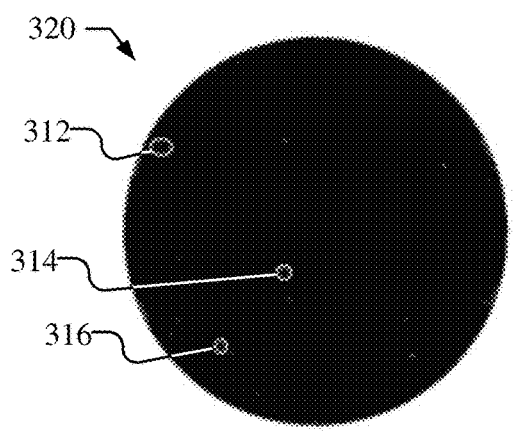
FIG. 3C illustrates a comparison of the images (defect maps) shown in FIGS. 3A and 3B to reduce or eliminate residual signals from the defects from the first surface in the image (defect map) of the second surface.

FIG. 3C, by way of example, illustrates a modified image 320 of the distal surface. Image 320 only shows defects 312, 314, and 316 on the distal surface (here, front surface) because the residual signals from the defects 306 and 308 in the proximal surface (back surface) may be reduced or eliminated based on the comparison of the two images 300 and 310.

Figure 4:
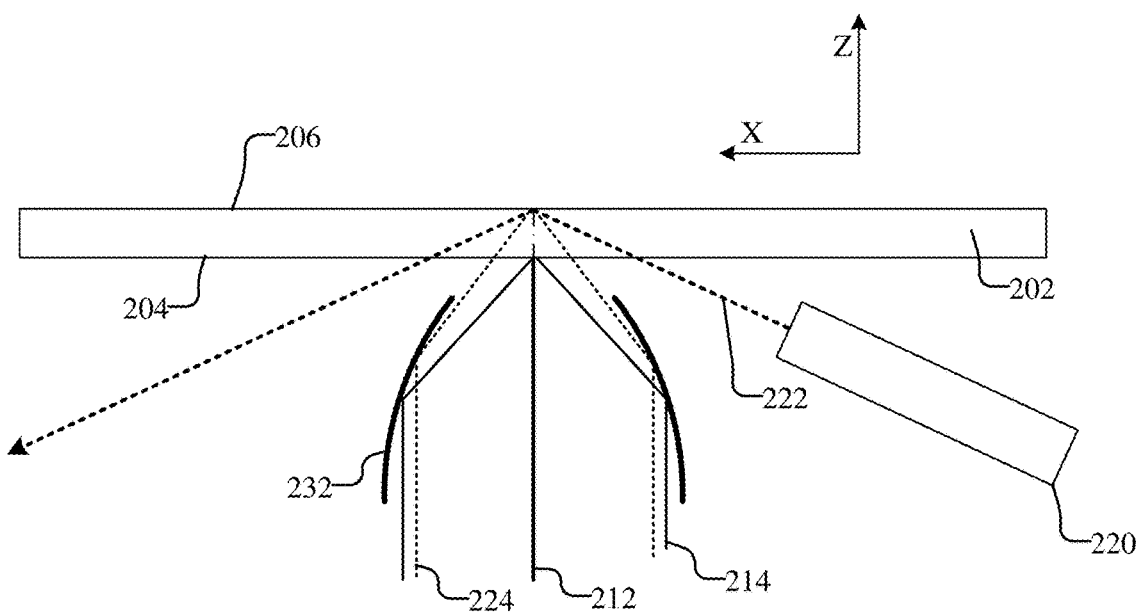
FIG. 4 illustrates a close view of a portion of the detection optics of the inspection system.

FIG. 4 illustrates a close view of a portion of the inspection system 200 including the second light source 220 and elliptical mirror 232 of the detection optics 230 and the substrate 202. FIG. 4 shows the obliquely incident light 222 produced by the second light source 220 and resulting backscattered light 224 from the distal surface 206 of the substrate 202, as well as the normally (or near normal) incident light 212 produced by the first light source (not shown in FIG. 4) and the resulting backscattered light 214 from the proximal surface 204 of the substrate 202. As illustrated, the light 222 from the second light source 220 may be incident on the proximal surface 204 at outside the x/y focus of detection optics 230 (illustrated by elliptical mirror 232) thereby producing reducing defect scattered intensities by the light 222 except at the distal/opposing surface 206. In other words, due to the lateral X, Y offset of the light 222 with respect to the detection optics 230, the backscattered light responsive to the light 222 from the second light source 220 are collected by the detection optics 230 for signals coming from or near the distal surface 206.

Also, the light 222 generated by the second light source 220 that is incident on the proximal surface 204 of the substrate 202 may be outside its own z focus, further reducing defect scattered intensities except at the distal/opposing surface 206. Thus, the second channel has increased signal sensitivity at and around the distal/opposing surface 206. The bulk and defects on the proximal surface 204 have significantly reduced signal sensitivity in the second channel. Thus, the use of the oblique angle of incidence of light 222 from the second light source 220 allows simultaneous front and back surface inspection. Moreover, by reducing the incident angle of the second light source 220 (i.e., so that light 222 is incident at a more oblique angle), the sensitivity increases throughout the substrate thickness. Defects in bulk may generate a strong signal and can be detected with increased sensitivity.

Due to residual absorption within the material of the substrate 202, defect signals decrease the farther the light 222 travels through the substrate 202. On the other hand, the incident angle and focus alignment of the second light source 220 in conjunction with the x/y/z focus of the detection optics 230, e.g., elliptical mirror 232, cause the opposite effect, i.e., the closer a defect to the distal surface 206, the stronger the defect signal. Accordingly, deliberate alignment of the incident angle of the light 222 from the second light source 220 may be used so that both effects can compensate each other resulting in same strength signals of same defect sizes along the z axis through the substrate 202. Signal strength is correlated to defect size, and accordingly, the size accuracy for the inspection system 200 may become independent of z position of the defect.

Figure 5:
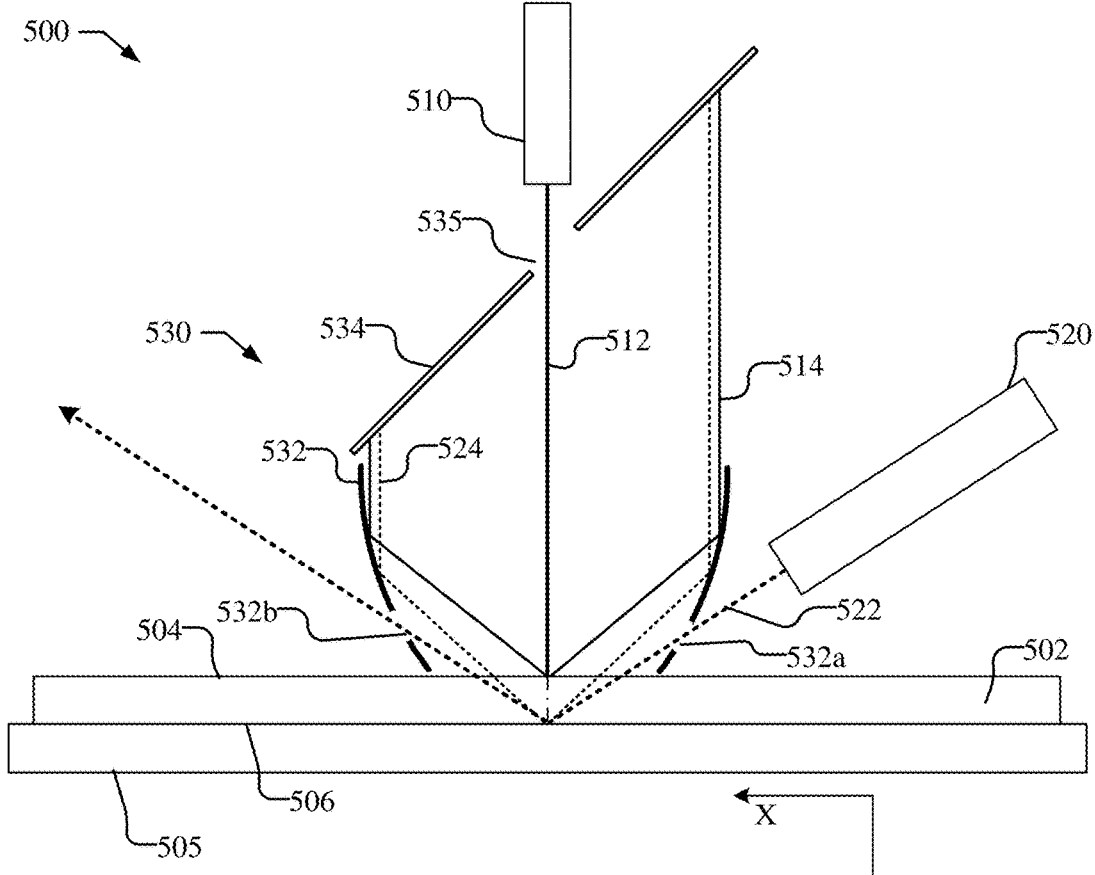
FIG. 5 illustrates a close view of a portion of the detection optics of the inspection system.

FIG. 5 illustrates a portion of an inspection system 500, which may be similar to inspection system 200 shown in FIG. 2, but includes detection optics 530 with apertures through which the oblique light 522 passes, and is illustrated in a front surface inspection configuration with a backside vacuum chuck 505 to hold the substrate 502. The chromatic filter and detectors are not illustrated in FIG. 5 for the sake of simplicity.

FIG. 5 illustrates normal (or near normal) incident light 512 from a first light source 510 that passes through an aperture 535 of a turning mirror 534 of the detection optics 530. FIG. 5 further illustrates oblique incident light 522 from a second light source 520. FIG. 5 does not illustrate an adjustment system for the oblique incident light 522, but an adjustment system may be present if desired. As illustrated, the elliptical mirror 532 of the detection optics 530, which collects backscattered light 514 and 524, includes a first aperture 532a, through which the light 522 passes and is obliquely incident on the substrate 502, and a second aperture 532b, through which the light 522 reflected from the substrate 502 exits the elliptical mirror 532. If desired, the apertures 532a and 532b may be extended, e.g., slits, to accommodate changes in the angle of incidence. Moreover, the aperture 532b may be extended so that light 522 reflected from both the proximal (top) surface 504 and the distal (bottom) surface 506 of the substrate 502 may pass and exit the elliptical mirror 532.

Figure 6:
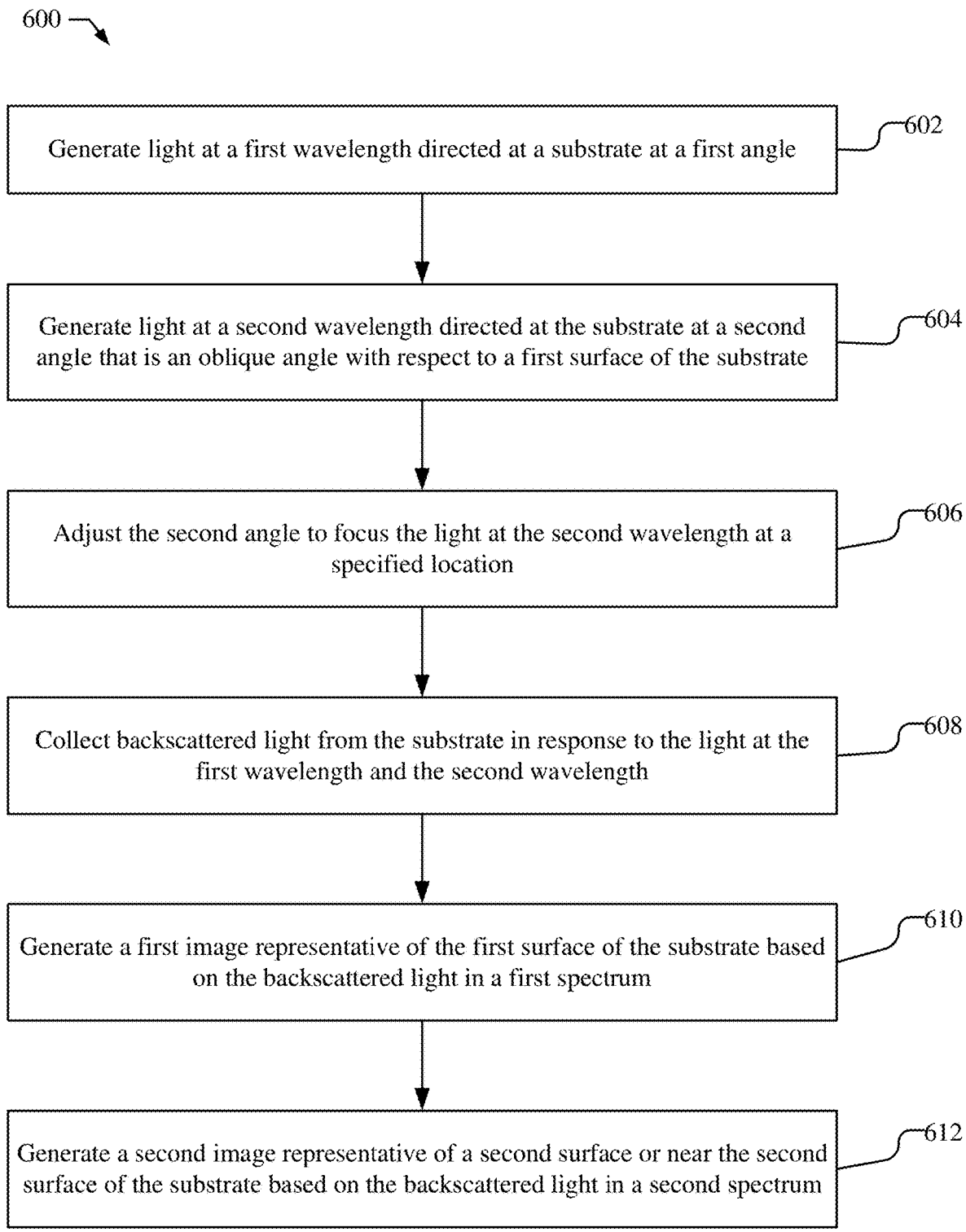
FIG. 6 is a flow chart illustrating a method for inspecting a substrate.

FIG. 6 is a flow chart 600 illustrating a method for substrate inspection, as discussed herein. The method, for example, inspects a first surface (e.g., the proximal surface) and a second surface (e.g., the distal surface) or near the second surface, e.g., using an inspection system, such as inspection system 200 shown in FIGS. 2 and 4 or inspection system 500 shown in FIG. 5.

At block 602, light is generated at a first wavelength directed at a substrate at a first angle, e.g., by a means for generating light at a first wavelength illustrated by the first light source 210 shown in FIG. 2 or the first light source 510 shown in FIG. 5.

At block 604, light is generated at a second wavelength directed at the substrate at a second angle that is an oblique angle with respect to a first surface of the substrate, e.g., by a means for generating light at a second wavelength illustrated by the second light source 220 shown in FIG. 2 or the second light source 520 shown in FIG. 5.

At block 606, the second angle is adjusted to focus the light at the second wavelength at a specified location, e.g., by a means for adjusting the second angle illustrated by the adjustment system 250 shown in FIG. 2.

At block 608, backscattered light is collected from the substrate in response to the light at the first wavelength and the second wavelength, e.g., by a means for collecting backscattered light illustrated by the detection optics 230 shown in FIG. 2 or the detection optics 530 shown in FIG. 5.

At block 610, a first image representative of the first surface of the substrate is generated based on the backscattered light in a first spectrum, e.g., by a means for generating a first image illustrated by the first detector 216 and computing system 260 shown in FIG. 2 and illustrated by image (defect map) 300 shown in FIG. 3A.

At block 612, a second image representative of a second surface or near the second surface of the substrate is generated based on the backscattered light in a second spectrum, e.g., by a means for generating a second image illustrated by the second detector 226 and computing system 260 shown in FIG. 2 and illustrated by image (defect map) 310 shown in FIG. 3B.

Based at least on the first image, defects on the first surface of the substrate may be detected, e.g., by the computing system 260. Further, based at least on the second image, defects on the second surface (or near the second surface) may be detected, e.g., by the computing system 260. In some implementations, based at least on the second image, defects in the bulk material between the first surface and the second surface (or near the second surface) may be detected, e.g., by the computing system 260. In some implementations, defects in the second surface (or near the second surface), and/or defects in the bulk material between the first surface and the second surface (or near the second surface) may be detected using the second image and the first image. The defects detected on the first surface and the second surface (or near the second surface), and in some implementations, the bulk material between the first surface and the second surface, may be reported with respect to the substrate, e.g., stored in memory associated with the inspection location of the substrate or an indication of defects provided.

In some implementations, the substrate may be opaque to the light at the first wavelength and at least partially transparent to the light at the second wavelength, e.g., as discussed with reference to light 212 and 222 in FIG. 2.

In some implementations, the backscattered light from the substrate may be collected by receiving the backscattered light from the first surface and the backscattered light from the second surface or near the second surface with an elliptical mirror, e.g., as illustrated by the elliptical mirror 232 shown in FIG. 2 or the elliptical mirror 532 shown in FIG. 5. Additionally, the backscattered light collected by the elliptical mirror may be directed towards at least one detector with at least one turning mirror comprising an aperture through which the light at the first wavelength is directed at the substrate at the first angle, e.g., as illustrated by the turning mirror 234 and aperture 235 shown in FIG. 2 or the turning mirror 534 and aperture 535 shown in FIG. 5. In some implementations, the elliptical mirror may include a first aperture through which the light at the second wavelength is directed at the substrate at the second angle, and a second aperture through which light at the second wavelength that is reflected by the substrate exits the elliptical mirror, e.g., as illustrated by the elliptical mirror 532 and apertures 532a and 532b shown in FIG. 5. In some implementations, the light at the second wavelength may be directed at the substrate at the second angle between the elliptical mirror and the first surface of the substrate, e.g., as illustrated by light 222 and elliptical mirror 232 shown in FIG. 2.

In some implementations, the first angle is at or near a normal angle with respect to the first surface, as illustrated in FIG. 2. In some implementations, the first wavelength is a visible wavelength and the second wavelength is an infrared wavelength, and the backscattered light in the second spectrum is produced by the light at the second wavelength directed at the substrate at the second angle, as discussed in reference to FIG. 2.

In some implementations, the light at the first wavelength is focused at a first location at or near the first surface of the substrate and the second angle is adjusted by adjusting the second angle to focus the light at the second wavelength at the specified location at or near the second surface of the substrate that is on a z axis of the substrate shared with the first location, e.g., as illustrated by the adjustment system 250 shown in FIG. 2 and discussed in FIG. 4.

In some implementations, a third image representative of defects on or near the second surface of the substrate corrected for residual signals of defects on the first surface may be generated based on a comparison of the first image and the second image, e.g., as discussed in reference to FIG. 2 and shown by image (defect map) 320 shown in FIG. 3C.

This summary is intended to provide an overview of subject matter of the present patent application. It is not intended to provide an exclusive or exhaustive explanation. The detailed description is included to provide further information about the present patent application.

Each of the non-limiting aspects described herein or in one or more of the attached Appendices can stand on its own, or can be combined in various permutations or combinations with one or more of the other aspects or other subject matter described in this document.

The above detailed description includes references to the accompanying drawings, which form a part of the detailed description. The drawings show, by way of illustration, specific implementations that can be practiced. These implementations are also referred to generally as "examples." Such examples can include elements in addition to those shown or described. However, examples are contemplated in which only those elements shown or described are provided. Moreover, examples are also contemplated using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in an aspect are still deemed to fall within the scope of that claim. Moreover, in the following aspects, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. Also, in the above Description, various features may be grouped together to streamline the disclosure. The inventive subject matter may lie in less than all features of a particular disclosed implementation. Thus, the following aspects are hereby incorporated into the Description as examples or implementations, with each aspect standing on its own as a separate implementation, and it is contemplated that such implementations can be combined with each other in various combinations or permutations. Therefore, the spirit and scope of the appended claims should not be limited to the foregoing description.

What is claimed is:

1. An inspection system for substrate inspection, the inspection system comprising:
   at least one illuminator that generates light at a first wavelength directed at a substrate at a first angle and generates light at a second wavelength directed at the substrate at a second angle that is an oblique angle with respect to a first surface of the substrate, wherein the light at the first wavelength is focused on the first surface at a first location;
   at least one moving mirror that adjusts the second angle independently of the first angle to focus the light at the second wavelength on a second surface at a specified location, the second surface being different from the first surface, wherein the at least one moving mirror adjusts the second angle to focus the light at the second wavelength on the second surface at the specified location that is on a z axis of the substrate shared with the first location;
   at least one detection optical element that collects backscattered light from the substrate in response to the light from the at least one illuminator; and
   at least one detector that receives the backscattered light in a first spectrum and generates a first image representative of the first surface of the substrate, and receives the backscattered light in a second spectrum to generate a second image representative of the second surface or bulk material of the substrate.

2. The inspection system of claim 1, wherein the substrate is opaque to the light at the first wavelength and at least partially transparent to the light at the second wavelength.

3. The inspection system of claim 1, wherein the at least one detection optical element comprises:
   an elliptical mirror that collects the backscattered light from the first surface and the backscattered light from the second surface or the bulk material; and
   at least one turning mirror that directs the backscattered light collected by the elliptical mirror towards the at least one detector, wherein the at least one turning mirror comprises an aperture through which the light at the first wavelength is directed at the substrate at the first angle.

4. The inspection system of claim 3, wherein the elliptical mirror comprises a first aperture through which the light at the second wavelength is directed at the substrate at the second angle, and a second aperture through which light at the second wavelength that is reflected by the substrate exits the elliptical mirror.

5. The inspection system of claim 3, wherein the light at the second wavelength is directed at the substrate at the second angle between the elliptical mirror and the first surface of the substrate.

6. The inspection system of claim 1, wherein the first angle is at a normal angle with respect to the first surface.

7. The inspection system of claim 1, wherein the backscattered light in the second spectrum is produced by the light at the second wavelength directed at the substrate at the second angle.

8. The inspection system of claim 1, wherein the first spectrum includes visible wavelengths, and the second spectrum includes infrared wavelengths and wherein the first wavelength is a visible wavelength and the second wavelength is an infrared wavelength.

9. The inspection system of claim 1, wherein the at least one illuminator includes a first illuminator that generates the light at the first wavelength and a second illuminator that generates the light at the second wavelength.

10. The inspection system of claim 1, wherein the at least one detector comprises:
a first detector that receives the backscattered light in the first spectrum;
a second detector that receives the backscattered light in the second spectrum; and
a chromatic filter that receives the backscattered light and directs the backscattered light in the first spectrum to the first detector and directs the backscattered light in the second spectrum to the second detector.

11. The inspection system of claim 1, further comprising an actuator coupled to the at least one moving mirror to adjust the second angle.

12. The inspection system of claim 1, further comprising:
a processor that generates a third image representative of defects on the second surface or the bulk material of the substrate corrected for residual signals of defects on the first surface based on a comparison of the first image and the second image.

13. A method comprising:
generating light at a first wavelength directed at a substrate at a first angle, wherein the light at the first wavelength is focused on a first surface at a first location;
generating light at a second wavelength directed at the substrate at a second angle that is an oblique angle with respect to the first surface of the substrate;
adjusting the second angle independently of the first angle to focus the light at the second wavelength on a second surface at a specified location, the second surface being different from the first surface, wherein adjusting the second angle comprises adjusting the second angle to focus the light at the second wavelength on the second surface at the specified location that is on a z axis of the substrate shared with the first location;
collecting backscattered light from the substrate in response to the light at the first wavelength and the second wavelength;
generating a first image representative of the first surface of the substrate based on the backscattered light in a first spectrum; and
generating a second image representative of the second surface or bulk material of the substrate based on the backscattered light in a second spectrum.

14. The method of claim 13, wherein the substrate is opaque to the light at the first wavelength and at least partially transparent to the light at the second wavelength.

15. The method of claim 13, wherein collecting the backscattered light from the substrate comprises:
receiving the backscattered light from the first surface and the backscattered light from the second surface or the bulk material with an elliptical mirror; and
directing the backscattered light collected by the elliptical mirror towards at least one detector with at least one turning mirror comprising an aperture through which the light at the first wavelength is directed at the substrate at the first angle.

16. The method of claim 15, wherein the elliptical mirror comprises a first aperture through which the light at the second wavelength is directed at the substrate at the second angle, and a second aperture through which light at the second wavelength that is reflected by the substrate exits the elliptical mirror.

17. The method of claim 15, wherein the light at the second wavelength is directed at the substrate at the second angle between the elliptical mirror and the first surface of the substrate.

18. The method of claim 13, wherein the first angle is at a normal angle with respect to the first surface.

19. The method of claim 13, wherein the first wavelength is a visible wavelength and the second wavelength is an infrared wavelength, and wherein the backscattered light in the second spectrum is produced by the light at the second wavelength directed at the substrate at the second angle.

20. The method of claim 13, further comprising:
generating a third image representative of defects on the second surface or the bulk material of the substrate corrected for residual signals of defects on the first surface based on a comparison of the first image and the second image.

21. An inspection system comprising:
means for generating light at a first wavelength directed at a substrate at a first angle, wherein the light at the first wavelength is focused on a first surface at a first location;
means for generating light at a second wavelength directed at the substrate at a second angle that is an oblique angle with respect to the first surface of the substrate;
means for adjusting the second angle independently of the first angle to focus the light at the second wavelength on a second surface at a specified location, the second surface being different from the first surface, wherein the means for adjusting adjusts the second angle to focus the light at the second wavelength on the second surface at the specified location that is on a z axis of the substrate shared with the first location;
means for collecting backscattered light from the substrate in response to the light at the first wavelength and the second wavelength;
means for generating a first image representative of the first surface of the substrate based on the backscattered light in a first spectrum; and
means for generating a second image representative of the second surface or bulk material of the substrate based on the backscattered light in a second spectrum.

* * * * *